United States Patent [19]
Tkacenko et al.

[11] Patent Number: 5,490,053
[45] Date of Patent: Feb. 6, 1996

[54] METHODS AND APPARATUS FOR AUXILIARY TRICKLE POWER SUPPLY

[75] Inventors: Nikola Tkacenko, Sunnyvale; Harold L. Sontag, III, San Jose, both of Calif.

[73] Assignee: Apple Computer, Inc., Cupertino, Calif.

[21] Appl. No.: 129,621

[22] Filed: Sep. 30, 1993

[51] Int. Cl.[6] .................................................... H02M 3/00
[52] U.S. Cl. ..................................... 363/15; 363/39
[58] Field of Search ............................. 363/15, 39, 44, 363/45, 46, 123

[56] References Cited

U.S. PATENT DOCUMENTS 3,851,239  11/1974  Suzuki ............................. 363/15

*Primary Examiner*—Jeffrey L. Sterrett
*Attorney, Agent, or Firm*—Mark A. Aaker

[57] ABSTRACT

Circuit arrangements and methods are disclosed for providing trickle voltages and currents when a main power supply is unavailable or, alternatively, for providing auxiliary power. In one embodiment, a trickle power supply consists of a bilaterally conducting semiconductor diode device such as a SIDAC receiving an unregulated DC input voltage through a resistor. The SIDAC is contemplated to have a specified breakover voltage $V_{bo}$ and current carrying capability chosen according to designer preference. A first capacitor is coupled between the SIDAC and a primary side of a step-down pulse transformer providing a specified reduction in voltage from a secondary side relative to the voltage applied to the primary side. The resistor, the first capacitor, and the SIDAC together form a modified RC resonant circuit oscillation characteristic. When the unregulated DC input voltage is applied, the first capacitor will charge up to the breakover voltage $V_{bo}$ of the SIDAC, whereafter the SIDAC becomes strongly conducting and charge is rapidly discharged to ground from the first capacitor through the SIDAC. When the stored charge has been depleted, the SIDAC becomes nonconducting, and charge is thereafter again accumulated in the first capacitor. The alternate charging and discharging of the first capacitor according to the $V_{bo}$ of the SIDAC produces an oscillating pulse waveform. The pulse waveform is subsequently reduced in magnitude by the pulse transformer, and thereafter routed through voltage regulating means to adjust the reduced voltage and current of the oscillating pulse waveform to an output trickle voltage and current of specified magnitude.

22 Claims, 2 Drawing Sheets

METHODS AND APPARATUS FOR AUXILIARY TRICKLE POWER SUPPLY

BACKGROUND OF THE INVENTION

1. Field of the Invention

The present invention relates generally to electrical power supplies. More particularly, the present invention relates to cost effective discrete circuit arrangements for providing a trickle voltage and current when a main power supply is unavailable, or for providing auxiliary power.

2. Art Background

Power supplies are undoubtedly the most common operational subsystem encountered in electrical and electronic systems. Power supplies are used to provide virtually all voltages and currents necessary to operate the vast variety of subsystems and peripherals which may exist within any particular electrical or electronic system arrangement. Power supplies may range from direct current (DC) voltage and current supplies to alternating current (AC) and high frequency (HF) supplies, and may comprise systems intended for either high or low outputs.

A power supply used to convert line voltage and current into system voltages and currents for use throughout an electrical or electronic system commonly is referred to as a main power supply. Construction of main power supplies is well known in the art, having been described in the literature for decades. In addition to having a main power supply, an electrical or electronic system may include one or more supplemental or auxiliary power supplies. Such supplemental or auxiliary power supplies produce voltages and currents which regulate or supplement the main power supply. Alternatively, the supplemental or auxiliary power supply may provide voltages and currents when the main power supply is unavailable, for example when the main supply is turned off.

A particular type of auxiliary power supply is a so-called "trickle" power supply which provides low amperage currents and voltages to operate certain devices while the main power supply is turned off. A representative example of a trickle power supply application is the "soft start" feature characteristic of most Macintosh® personal computers manufactured and distributed by Apple Computer, Inc., Cupertino, Calif. 95014 (Macintosh is a registered trademark of Apple Computer, Inc.). As embodied in the above-mentioned Macintosh personal computers, the soft start feature consists of the main power supply being coupled through an electrically active switching device to the AC mains when a computer user presses a start button located on a computer keyboard. The soft start feature is distinctive in that the main power supply is not coupled to the mains via mechanical contacts in a latching, 2-pole mechanical switch. Rather than feeling a heavy mechanical click as the 2-pole switch on a computer enclosure is engaged, the Macintosh user turning on the computer instead experiences gently pressing the nonlatching start button on the keyboard and the computer thereafter beginning to operate. In the soft start case, the start switch must have power supplied to it even though the main power supply and the computer are turned off.

A prior art trickle power supply arrangement 1 realizing Apple's soft start feature is illustrated in FIG. 1, wherein an unregulated AC voltage is coupled to a laminated line frequency transformer 4 having a primary side and a secondary side. As shown in FIG. 1, transformer 4 converts the higher unregulated voltage (typically 85 to 270 VAC) and current into an appropriate lower voltage and current. The stepped-down lower voltage is typically subsequently accumulated in a capacitor 3 and regulated by an appropriately chosen Zener diode 5 to produce an output trickle voltage and current coupled to a start switch (not shown). In the arrangement 1 illustrated In FIG. 1, the output trickle voltage should be sufficient to drive the start switch, typically comprising approximately 5 volts (V) at an output current of approximately 10 milliamperes (mA). It is possible for transformer 4 to have more than one secondary, each secondary with its own combination of capacitor and Zener as necessary for the design application. For example, a first combination of capacitor and Zener would be dedicated for the trickle supply, and a second different combination dedicated for operating a pulse-width modulator circuit. Alternatively, a self-oscillating flyback or other switching converter arrangement (not shown) may be used in place of laminated transformer 4 in FIG. 1 to reduce the input voltage prior to application to the Zener diode 5. Where a switching converter is used, a one or more transistors will be necessary to control the flyback operation.

In the prior art trickle power supply arrangements discussed above, the cost of the line frequency transformer can account for a substantial portion of the total cost of the trickle power supply. Especially when designing high volume products, e.g., low-cost consumer electrical or electronic items manufactured in the tens or hundreds of thousands of units per month, it is always desirable to achieve a similar or substantially identical result with a lower cost product embodiment. For example, in the above example of personal computers, it would be greatly desirable to be able to produce the trickle voltage and current without requiring the relatively high cost laminated line transformer. Moreover, the laminated line transformer occupies a considerable amount of physical area and volume within the computer relative to other circuit components. As form factors of electronic devices including personal computers continue to shrink, it is invariably necessary to reduce the size of internal components or subsystems within those systems.

As will be described in the following detailed description, the present invention overcomes many of the cost and size problems associated with prior art trickle power supplies by replacing the costly line transformer or switching converter component with an inexpensive but robust SIDAC trigger device. The SIDAC is a known, bidirectionally conducting semiconductor device, and is principally intended for use in arc or gas plasma lamp illumination applications. For example, SIDACs are typically used for generating the high voltage spark necessary to initiate or "strike" the conductive gas plasma reaction in high pressure gas discharge lamps. However, the unique conduction characteristics of SIDAC devices may also be advantageously adapted to the present invention, as will be described in more detail in the following paragraphs. As a result of the replacement of the line transformer with the SIDAC, output trickle voltage and current are produced at substantial cost and space savings. Moreover, the SIDAC-based trickle supply has particular advantages in reducing line frequency radiation in radiation sensitive applications, as is discussed in the paragraphs below.

SUMMARY OF THE INVENTION

Circuit arrangements and methods are disclosed for providing trickle voltages and currents when a main power supply is unavailable or, alternatively, for providing auxiliary power. In one embodiment, a trickle power supply consists of a bilaterally conducting semiconductor SIDAC device receiving an unregulated DC input voltage through a resistor. The SIDAC is contemplated to have a specified breakover voltage $V_{bo}$ and current carrying capability which is chosen according to designer preference. A first capacitor is coupled between the SIDAC and a primary side of a step-down pulse transformer providing a specified reduction in voltage from a secondary side relative to the voltage applied to the primary side. The resistor, the first capacitor, and the SIDAC together form a resonant circuit with a modified RC oscillation characteristic.

When the unregulated DC input voltage is applied across the first capacitor, the first capacitor will charge up to the breakover voltage $V_{bo}$ of the SIDAC. Thereafter the SIDAC becomes strongly conducting, and charge is rapidly discharged to ground from the first capacitor through the SIDAC with voltage across the SIDAC falling quickly to zero. When the stored charge has been depleted from the first capacitor, the SIDAC becomes nonconducting, and charge is thereafter again accumulated on the first capacitor. The alternate charging and discharging of the first capacitor according to the $V_{bo}$ of the SIDAC produces an oscillating pulse waveform partially dependent on RC time constant τ. The pulse waveform is subsequently reduced in magnitude by the pulse transformer. The reduced oscillating pulse waveform from the secondary side of the pulse transformer is thereafter routed through a rectifying diode and then applied across a second capacitor serving to accumulate current flowing through the secondary side of the pulse transformer. A Zener diode further coupled across the second capacitor regulates the voltage and current of the oscillating pulse waveform into a desired trickle voltage and current of specified magnitude.

In an alternative embodiment, a "catch" diode may be coupled in parallel with the SIDAC to improve the efficiency of the trickle power supply, wherein the catch diode permits reverse current (charge) flowing through the primary of the pulse transformer to be stored on the first capacitor, thus reducing the amount of charging the first capacitor must undergo to reach the breakover voltage $V_{bo}$ of the SIDAC. In a second alternative embodiment, the trickle power supply may be adapted for use in stand-alone applications by including an AC-rectifying arrangement between the trickle supply input receiving an unregulated AC line input voltage and the SIDAC. In the second embodiment, the trickle power supply operates generally to convert an AC line input voltage to a lower voltage and current DC output.

BRIEF DESCRIPTION OF THE DRAWINGS

The present invention will be understood more fully from the detailed description given below and from the accompanying drawings of the preferred embodiment of the invention in which.

DETAILED DESCRIPTION OF THE INVENTION

The present invention discloses circuit arrangements and methods for providing trickle voltages and currents to a peripheral device when a main power supply is unavailable, or for providing auxiliary power. In the following description, for purposes of explanation, specific numbers, times, dimensions, and configurations are set forth in order to provide a thorough understanding of the present invention. However, it will be apparent to one skilled in the art that the present invention may be practiced without these specific details. In other instances, well known systems are shown in diagrammatic or block diagram form in order not to obscure the present invention unnecessarily.

Figure 1:
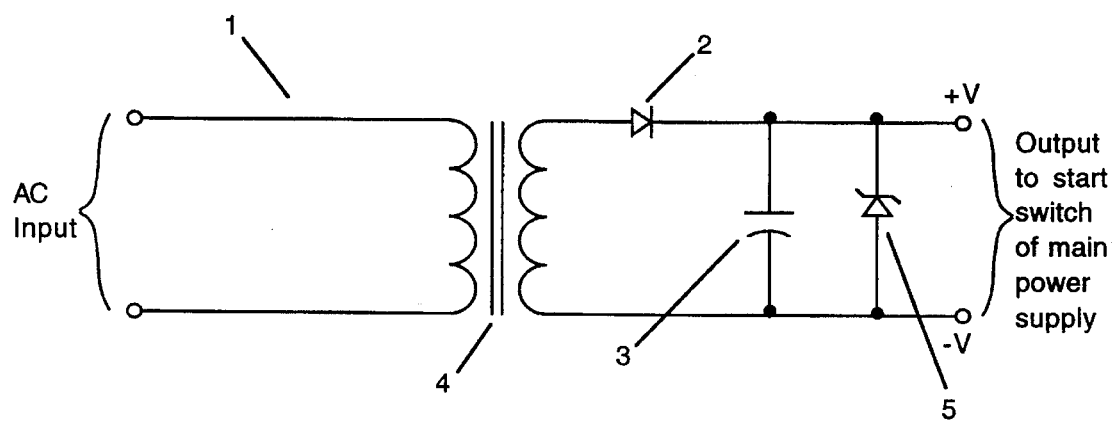
FIG. 1 illustrates a prior art arrangement of a trickle power supply.
Figure 2:
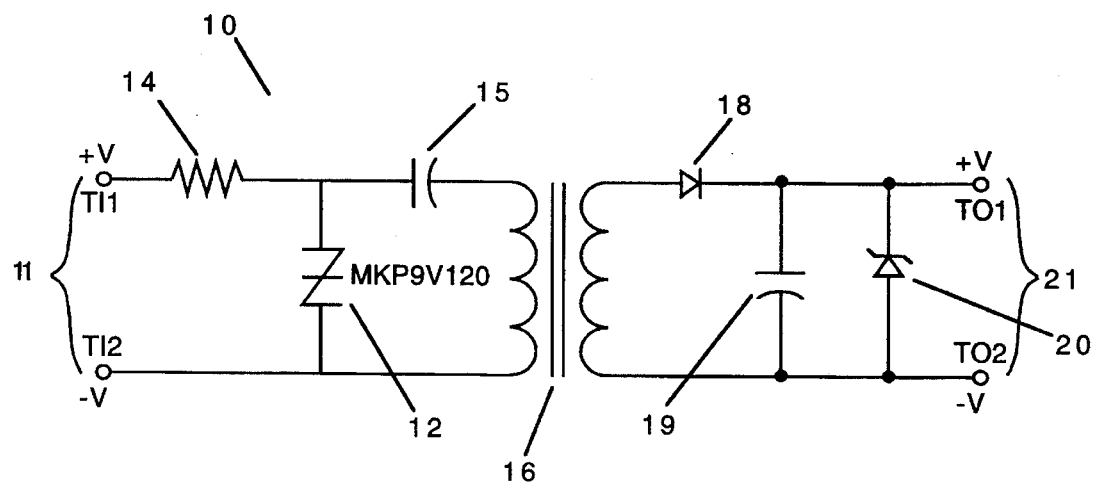
FIG. 2 illustrates a first embodiment of trickle power supply according to the present invention.

Reference is now made to FIG. 2, wherein is shown a schematic of a trickle power supply arrangement 10 according to a first embodiment of the present invention. Trickle power supply arrangement 10 is disposed within a main power supply of an electrical or electronic system (not shown), for example and without limitation a personal digital computer. However, as will be described below in connection with FIG. 4, the present invention also may be adapted for use as a stand-alone power supply for low voltage and current applications, e.g., a low power battery charger. As shown in FIG. 2, the arrangement 10 consists of several essential components of the prior art arrangement 1 shown in FIG. 1. However, the arrangement 10 of the present invention is principally distinguished from the prior art by the inclusion of a bidirectionally conducting SIDAC semiconductor device 12. SIDACs are known devices principally intended for use as triggering devices in arc or gas plasma lamp illumination applications. For example, SIDACs are typically used for generating the high voltage pulse necessary to initiate or "strike" the conductive gas plasma reaction in high pressure gas discharge lamps. However, the unique conduction characteristics of SIDAC devices may also be advantageously adapted to provide a continuous source of regulated DC power, as will be described now in more detail.

In FIG. 2, arrangement 10 is coupled to receive an unregulated DC voltage spanning V+ to V−, derived from an appropriate rectifying bridge device (not shown) as is generally known. The unregulated DC voltage, typically 250–400 V, is applied to an input 11 having first and second input taps TI1 and TI2. A semiconductor SIDAC device 12 having first and second terminals is coupled across the taps TI1 and TI2 of input 11 such that the unregulated input voltage is applied across SIDAC 12. In one presently practiced embodiment, SIDAC 12 comprises a type MKP9V120 device, manufactured and sold by Motorola Inc., Schaumberg, Ill. The MKP9V120 SIDAC is characterized by having a so-called "breakover voltage" $V_{bo}$, wherein the SIDAC 12 switches from a high impedance off-state to a low-voltage on-state. The breakover voltage characteristic of SIDAC 12 is bilaterally symmetrical in both positive and negative directions, wherein SIDAC 12 will switch to its low-voltage on-state with an impressed voltage of either positive or negative magnitude. The SIDAC 12 is further characterized by having an extremely low on-state impedance with large current carrying capacity. That is, once the breakover voltage $V_{bo}$ has been exceeded, SIDAC 12 will conduct large amounts of current with very low resistance—typically several amperes. Further, the low impedance on-state conduction mode will remain active for virtually the entire breakover voltage range. For example, the MKP9V120 type SIDAC employed in one embodiment of the present invention has a $V_{bo}$ rating of 110 to 125 V. Once its breakover voltage $V_{bo}$ is exceeded, the SIDAC device 12 will remain conductive in its low voltage, low impedance state down to zero volts, allowing virtually all of the impressed voltage range to be captured or used to practical advantage. SIDAC devices are manufactured having a variety of breakover voltages and current carrying capacities. For further information, the reader is referred to Motorola's Thyristor Device Databook, Rev. 5 (1993), ppg. 1-4-1 and following.

With further reference to FIG. 2, resistive means typically comprising a resistor 14 is coupled between the V+ input tap TI1 of input 11 and the first terminal of SIDAC 12. Coupled respectively to the first and second terminals of, and in parallel with, SIDAC 12 is a first capacitance means comprising capacitor 15 in turn coupled to a pulse transformer device 16. Capacitor 15 and transformer 16 together are thus coupled in parallel with SIDAC 12 across input 11. Resistor 14 and capacitor 15 are chosen in combination with SIDAC 12 so as to form an oscillating circuit with a natural frequency $f$ and amplitude according to the designer's preference or requirements. Resistor 14 and capacitor 15 in combination with SIDAC 12 are central in generating the final output voltage and current levels of the trickle power supply 10, described further below. In one embodiment of the present embodiment, resistor 14 consists of a 39 kilohm (k$\Omega$) resistor and capacitor 15 consists of a 0.1 microfarad ($\mu$F) capacitor rated at 250 V, resulting in $f$~500 Hz to 5 kHz when operating in conjunction with SIDAC 12 having a $V_{bo}$ of 110–125 V.

In the present invention, it is anticipated that pulse transformer 16 comprises a miniature, wirewound step-down transformer having a high voltage primary side and a low voltage secondary side, wherein transformer 16 reduces the voltage excursions of the oscillations induced by the RC combination of resistor 14 and capacitor 15 operating in conjunction with SIDAC 12. In one presently practiced embodiment, transformer 16 provides for a 10:1 step-down in voltage between the primary and secondary sides, with approximately 0.3–0.6 millihenries (mH) inductance. A leakage inductance may also be present within transformer 16, depending upon the coupling between the primary and secondary sides of transformer 16. Accordingly, the above 10:1 step-down transformer provides a ten-fold reduction in the amplitude of the induced oscillations, resulting in an output of about 25–40 V from the transformer secondary. However, other voltage reduction multiples may be used equally well with the present invention, according to designer preference.

Still referring to FIG. 2, a diode 18 of a known type is coupled in a forward biased arrangement between one arm of the secondary side of transformer 16 and a V+ output tap (TO1) of an output 21 of trickle supply 10. A second capacitance means 19 and a precision voltage regulation means 20 are coupled in parallel between the anode terminal of diode 18 and a V– output tap (TO2) of output 21. As presently practiced, second capacitance means 19 consists of a second capacitor of approximately 100 $\mu$F, and the voltage regulation means 20 consists of a 5.1 volt Zener diode operating in typical reverse-biased configuration, as is generally known. The trickle power supply arrangement 10 constructed with the foregoing devices and parameters results in a final trickle voltage of approximately 5 V at 10 mA current available at output 21. As in the prior art, the skilled reader will recognize that it is possible for transformer 16 to have multiple secondaries and multiple outputs 21, wherein each secondary would be associated with its own combination of diode 18, capacitance means 19, and Zener voltage regulation means 20 depending upon the design requirements. For example, it is contemplated that the present invention could provide a first combination of diode, capacitor, and Zener diode whose output 21 delivers a trickle voltage and current, and a second, different combination of diode, capacitor, and Zener diode whose output 21' could be dedicated for operating a pulse-width modulator circuit (not shown).

In operation, the unregulated bridge-rectified DC voltage applied to taps TI1 and TI2 of input 11 of the trickle power supply arrangement 10 is essentially converted into a periodic waveform consisting of consecutive rising and falling profiles. The rising voltage profiles are governed by resistor 14 and capacitor 15, and are similar to RC-circuit charging characteristics wherein the voltage rises increases asymptotically to a final value. Alternatively, the falling voltage profiles are controlled by the SIDAC conduction characteristics, wherein voltage falls sharply depending when the diode is conductive. The oscillating, periodic waveform is therefore generated by virtue of the charge storing effect of resistor 14 and capacitor 15 operating in conjunction with the switching effect of SIDAC 12. In the present invention, capacitor 15 is initially uncharged. When the unregulated rectified DC voltage V+ is first applied, the voltage across capacitor 15 increases as charge is stored in capacitor 15. SIDAC 12, having the rising input voltage applied across it, initially will remain nonconductive in its off-state so long as the voltage across SIDAC 12 remains below the breakover voltage $V_{bo}$. However, once the applied voltage V+ reaches and exceeds the $V_{bo}$, in this case between 110 and 125 volts, SIDAC 12 will switch to its high conduction low voltage on-state condition. Charge stored in capacitor 15 thereafter is rapidly discharged through SIDAC 12 to ground, with voltage across the SIDAC 12 falling sharply to 0 V. During charging of capacitor 15, the resultant voltage characteristic of the arrangement of SIDAC 12, resistor 14, and capacitor 15 is very similar to the rising voltage characteristic of an ordinary RC circuit. However, due to the very low impedance conduction mode of SIDAC 12 in its on-state, once $V_{bo}$ has been exceeded the discharge voltage characteristic of the arrangement of SIDAC 12, resistor 14, and capacitor 15 is simply a sharp drop to zero V, or even negative voltage (see discussion below). Once the SIDAC 12 voltage is zero V, the SIDAC will switch to its off-state nonconductive mode, and capacitor 15 will begin charging up, repeating the cycle.

The combination of SIDAC 12, resistor 14, and capacitor 15 thus operate together in concert to provide an oscillating waveform of chosen frequency and voltage swing suitable for further reduction by transformer 16. Specifically, SIDAC 12 having a $V_{bo}$ of approximately 110–125 V and operating in conjunction with resistor 14 and capacitor 15 having respective device parameters of 39 k$\Omega$ and 0.1 $\mu$F induces oscillations having $f$~500 Hz to 5 kHz and a voltage swing equivalent to the input voltage from the unregulated DC source, typically 250 to 400 V at relatively high current values. In addition, transformer 16 is chosen so that the voltage appearing at the transformer secondary is appropriately tailored to the output requirements for the trickle power supply. As stated above, in one presently practiced embodiment transformer 16 provides a ten-fold reduction in the voltage swing of the SIDAC-induced oscillations, resulting in an output of about 25–40 V from the transformer secondary at reasonable current levels. The reader will appreciate that many alternative transformer embodiments may be used with the SIDAC arrangement of the present invention according to the needs of the designer.

The oscillating voltage waveform, having been reduced in magnitude by the pulse transformer 16, is subsequently routed through forward-biased rectifying diode 18 to prevent reverse flowing current in the secondary side of transformer 16. Thereafter, the waveform is applied across second capacitor 19, which charges to a voltage corresponding to the current flowing in the secondary of transformer 16 as is generally known, thereby forming a time-integrated average voltage. It will be recalled that the relatively high current levels discharged through SIDAC 12 are preserved in the step-down transformer 16. If the discharge controlling device (i.e., the SIDAC) does not have a sufficiently high current carrying capacity, the current flowing in the transformer secondary will be insufficient to drive any load connected to the output 21. Accordingly, low current capacity devices would be precluded in the present invention. Finally, the capacitor-averaged time-integrated voltage is applied across the Zener diode 20, thereby regulating the voltage according to the Zener breakdown voltage as is generally known. The voltage appearing across the Zener diode 20 forms the output voltage supplied to taps TO1 and TO2 of the output 21. As set out above, the presently practiced embodiment delivers approximately 5 V at 10 mA, although it should be noted that the output voltage and current may be adjusted for any particular situation according to the needs of the designer. The device parameters chosen for resistor 14 and capacitor 15 for any given breakover voltage $V_{bo}$ for SIDAC 12 will to a large extent determine the frequency, voltage, and current of the oscillating voltage waveform, and thus determine the voltage and current available at output 21.

Unlike prior art embodiments described above and embodied in hardware, the present invention substantially overcomes the cost and volume constraints of prior art trickle power supplies. Whereas prior art trickle power supplies typically require transistor-controlled switching converters or laminated line transformers to generate the reduced trickle output voltage and current, the SIDAC 12 in combination with the miniature pulse transformer 16 of the present invention deliver similar performance at substantial cost and space savings. Such savings are readily useful in high volume low cost power supply manufacturing applications, for example consumer electronic equipment including personal digital computer systems. However, the trickle power supply arrangement 10 may also be used in other applications, for example replacing an auxiliary power supply for a pulse width modulation circuit in controlling output from a main power supply, or even as a stand-alone power supply.

A further benefit of the present invention is that the SIDAC-transformer combination inherently avoids 60 Hz electromagnetic interference (EMI) radiation emitted from trickle supplies employing line transformers. Elimination of the 60 Hz noise precludes adverse effects on cathode ray tube (CRT) display devices, commonly used in conjunction with personal computers. Instead of emitting the 60 Hz EMI, the smaller higher frequency pulses generated by SIDAC 12 and transformer 16 in combination with resistor 14 and capacitor 15 are constrained entirely within transformer 16. Therefore, a trickle power supply constructed according to the present invention will not require specialized shielding, for example metallized covers, as in the case of laminated core line transformers. Costs associated with the shielding is also saved.

Figure 3:
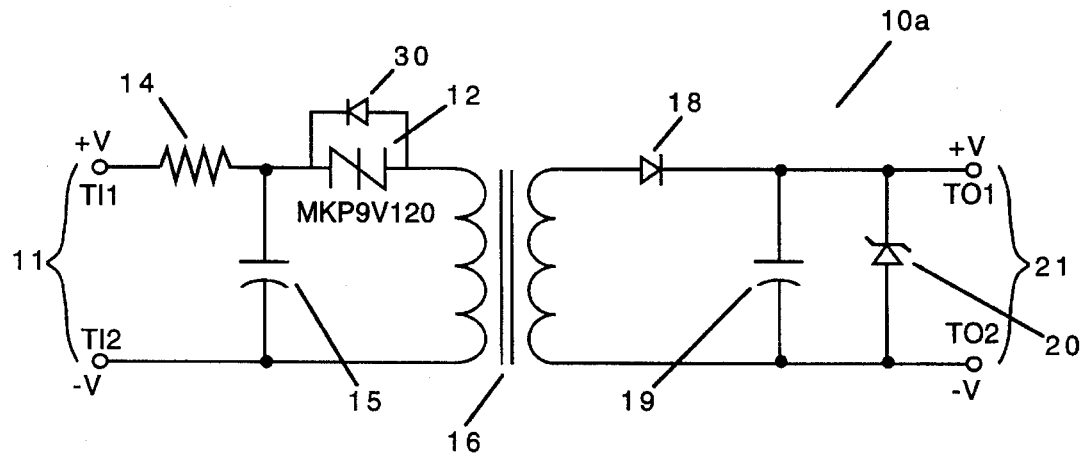
FIG. 3 illustrates an alternative embodiment of the trickle power supply shown in FIG. 2, wherein a "catch" diode enables inductively stored energy to be recovered.

Reference is now made to FIG. 3, wherein is illustrated an alternative embodiment of the present invention. In FIG. 3, a trickle power supply arrangement 10a substantially similar to that shown in FIG. 2 further includes a second diode 30. Diode 30 is used as a so-called "catch" diode across SIDAC 12, to return energy inductively stored in pulse transformer 16. As previously discussed in connection with FIG. 2, when SIDAC 12 reaches its breakover voltage $V_{bo}$ and begins to conduct, charge stored in capacitor 15 is rapidly discharged through SIDAC 12. However, the voltage across SIDAC 12 actually passes through zero ground to a negative voltage condition while SIDAC 12 is in its on-state. The foregoing is principally a consequence of the inductance inherent in pulse transformer 16 due to the conductive windings of the transformer primary and secondary. Recall from above and FIG. 2 that transformer 16 has an inductance of order 0.5 mH, which operates together with the associated leakage inductance due to imperfect coupling between transformer primary and secondary. Both inductances contribute to LC-type circuit oscillations in the components coupled to the transformer primary, thereby leading to oscillations which have negative voltages and negative (i.e., reverse-flowing) currents. The catch diode 30 provides a return path for the negatively flowing current, returning the negatively flowing electrons to capacitor 15 and "saving" the charge that would other wise be "lost" in the arrangement illustrated in FIG. 2. The lost charge and energy typically would be converted to heat within transformer 16. As a result, in the arrangement 10a shown in FIG. 3, the capacitor 15 does not have to be charged from a zero volt condition after each cycle of SIDAC 12. Instead, diode 30 having returned some quantity of charge to capacitor 15, capacitor 15 would begin charging from some positive voltage condition, thereby requiring less power from the unregulated DC supply (i.e., the rectifying bridge), ultimately lowering the power requirement for the entire main power supply.

Figure 4:
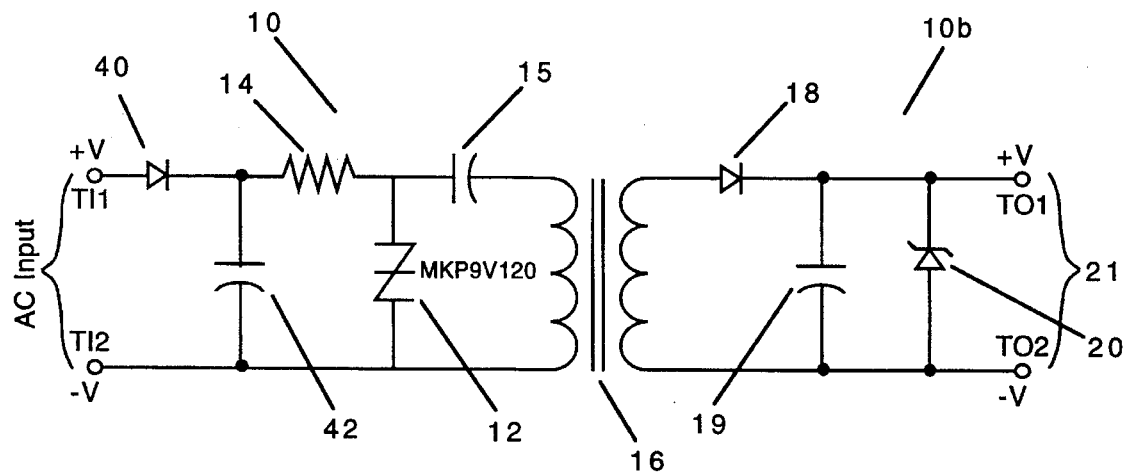
FIG. 4 illustrates a second alternative embodiment of the trickle power supply shown in FIG. 2, wherein the trickle power supply may be used as a stand-alone low voltage and current power supply.

Finally, with brief reference to FIG. 4, a second alternative embodiment of the present invention is shown. As shown in FIG. 4, a trickle power supply arrangement 10b is adapted for use as a stand-alone low voltage and current power supply coupled to receive an AC line input. Arrangement 10 has a rectifying diode 40 coupled in line with the input tap TI1, and further has a filtering capacitor 42 coupled across TI1 and TI2 of input 11. Accordingly, the AC input supplied to arrangement 10b is first rectified by diode 40 and then is time-averaged by capacitor 42, thereby forming a rectified, unregulated DC signal which is subsequently processed in a manner substantially similar to the trickle power supply arrangement 10 shown in FIG. 2. The arrangement 10b is contemplated to be useful in low voltage and current applications, for example charging up rechargeable batteries in light weight portable electronic systems, or other low continuous power environments.

The foregoing has described circuit arrangements and methods for providing trickle voltages and currents when a main power supply is unavailable, or for providing auxiliary voltages and currents. The trickle power supply of the present invention may be used in any circuit where moderate voltages and currents are required to initiate operation in a main power supply or, alternatively, for auxiliary power generation in addition to the main power supply. Although the foregoing has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention, the scope of the invention being limited only by the following claims.

We claim:

1. A trickle power supply for generating trickle voltages and currents, said trickle power supply comprising:

charge storage means coupled to an unregulated direct current (DC) source for receiving and storing electric charge;

bidirectionally conducting semiconductor diode means coupled to the charge storage means for enabling said charge storage means to alternately charge and discharge, thereby generating a periodic oscillating waveform having a plurality of alternating charging and discharging profiles;

voltage reducing means coupled to said charge storage means and said bidirectionally conducting semiconductor diode means for converting said periodic oscillating waveform into a reduced voltage periodic oscillating waveform, and voltage regulation means coupled to said voltage reducing means for accumulating and converting said reduced periodic oscillating waveform into regulated voltage and current outputs comprising said trickle voltages and currents.

2. The trickle power supply as set forth in claim 1, wherein said charge storage means comprises a resistor for providing an electrical resistance and a first capacitor for providing a first electrical capacitance, said resistor and said first capacitor coupled together and having a charging profile substantially similar to an RC circuit charging profile when said unregulated DC source is applied to the trickle power supply.

3. The trickle power supply as set forth in claim 1, wherein said bidirectionally conducting semiconductor diode means comprises a SIDAC having a breakover voltage $V_{bo}$, said SIDAC comprising a high impedance high voltage nonconducting first state when said unregulated DC source is below $V_{bo}$, said SIDAC further comprising a low impedance low voltage conducting second state when said unregulated DC source is above $V_{bo}$.

4. The trickle power supply as set forth in claim 1, wherein said voltage reducing means comprises a miniature pulse step-down transformer having a high voltage primary side and a low voltage secondary side, said pulse transformer producing said reduced voltage periodic oscillating waveform at its secondary side when said periodic oscillating waveform is applied to its primary side.

5. The trickle power supply according to claim 1 further comprising means for generating continuous DC trickle voltages and currents from an alternating current (AC) source, said means for generating continuous DC trickle voltages and currents comprising AC rectifying and filtering means coupled between an AC line input and said charge storage means, said AC rectifying and filtering means comprising:

a first diode coupled to receive and rectify an AC line input signal, and a first capacitor coupled to the first diode for providing a filtered, unregulated direct current (DC) voltage and current, said first capacitor further coupled to said charge storage means of said trickle power supply.

6. The trickle power supply as set forth in claim 1, wherein said voltage regulation means comprises a first diode coupled to said voltage reducing means for substantially removing the charging and discharging profiles from said reduced voltage periodic oscillating waveform, a capacitor coupled to said first diode for accumulating said reduced voltage periodic oscillating waveform, and a Zener diode coupled to said capacitor for adjusting said reduced voltage periodic oscillating waveform such that the regulated voltage and current of the trickle supply correspond to a chosen design point.

7. The trickle power supply as set forth in claim 1 further comprising a charge recovery means for recovering a portion of charge discharged through said bidirectionally conducting semiconductor diode means, said charge recovery means comprising a rectifying means coupled to said bidirectionally conducting semiconductor diode means for redirecting the portion of charge to said charge storage means according to an amount of energy inductively stored in said voltage reducing means.

8. The trickle power supply as set forth in claim 7, wherein said rectifying means comprises a "catch" diode coupled across said bidirectionally conducting semiconductor diode means.

9. A trickle power supply for generating trickle voltages and currents from an unregulated direct current (DC) source, said trickle power supply comprising:

a resistor coupled to said unregulated DC power source;

a first capacitor coupled to said resistor for storing charge delivered by said unregulated DC power source;

a SIDAC semiconductor device coupled to the resistor and the capacitor for enabling said capacitor to alternately charge and discharge, thereby generating a periodic oscillating waveform having a plurality of alternating charging and discharging profiles;

said SIDAC having a breakover voltage $V_{bo}$, said SIDAC comprising a high impedance high voltage nonconducting first state when said unregulated DC source is below $V_{bo}$, said SIDAC further comprising a low impedance low voltage conducting second state when said unregulated DC source is above $V_{bo}$;

voltage reducing means coupled to said first capacitor and said SIDAC semiconductor device for converting said periodic oscillating waveform into a reduced voltage periodic oscillating waveform, and voltage regulation means coupled to said voltage reducing means for accumulating and converting said modified periodic oscillating waveform into a regulated voltage and current outputs, said voltage regulation means thereby producing said trickle voltages and currents.

10. The trickle power supply as set forth in claim 9 further comprising a charge recovery means for recovering a portion of charge discharged through said SIDAC, said charge recovery means comprising a "catch" diode coupled to said SIDAC for redirecting said portion of charge to the first capacitor according to an amount of energy inductively stored in said voltage reducing means.

11. The trickle power supply as set forth in claim 9, wherein said voltage reducing means comprises a miniature pulse step-down transformer having a high voltage primary side and a low voltage secondary side, said pulse transformer producing said reduced voltage periodic oscillating waveform at its secondary side when said periodic oscillating waveform is applied to its primary side.

12. The trickle power supply as set forth in claim 9, wherein said voltage regulation means comprises a first diode coupled to said voltage reducing means for substantially removing the charging and discharging profiles from said reduced voltage periodic oscillating waveform, a second capacitor coupled to said first diode for accumulating said reduced voltage periodic oscillating waveform, and a Zener diode coupled to the second capacitor for adjusting said reduced voltage periodic oscillating waveform such that the regulated voltage and current of the trickle supply correspond to a chosen design point.

13. In a trickle power supply, a method for generating trickle voltages and currents comprising the steps of:

receiving and storing charge from an unregulated direct current (DC) source in a charge storage means;

generating a periodic oscillating waveform having a plurality of alternating charging and discharging profiles using a bidirectionally conducting semiconductor diode means coupled to said charge storage means, said bidirectionally conducting semiconductor diode means enabling said charge storage means to alternately charge and discharge;

converting said periodic oscillating waveform into a reduced voltage periodic oscillating waveform using a voltage reducing means coupled to said charge storage means and said bidirectionally conducting semiconductor diode means, and accumulating and converting said reduced voltage periodic oscillating waveform into regulated voltage and current outputs using a voltage regulation means coupled to said voltage reducing means, said regulated voltage and current outputs comprising said trickle voltages and currents.

14. The method according to claim 13 further comprising the step of recovering a portion of charge discharged through said bidirectionally conducting semiconductor diode means according to an amount of energy inductively stored in said pulse transformer means.

15. The method according to claim 14, wherein the step of recovering said portion of charge comprises providing a charge recovery means including a second rectifying means coupled to said bidirectionally conducting semiconductor diode means.

16. The method according to claim 15, wherein said second rectifying means comprises a "catch" diode coupled across said bidirectionally conducting semiconductor diode means.

17. The method according to claim 13, wherein the step of generating said periodic oscillating waveform comprises the step of coupling a bidirectionally conducting semiconductor diode means to said unregulated DC source and said charge storage means to alternately charge and discharge said charge storage means, thereby generating said periodic oscillating waveform.

18. The method according to claim 17, wherein said bidirectionally conducting semiconductor diode means comprises a SIDAC having a breakover voltage $V_{bo}$, wherein said SIDAC comprises a high impedance high voltage nonconducting first state when said unregulated DC source is below $V_{bo}$, said SIDAC further comprising a low impedance low voltage conducting second state when said unregulated DC source is above $V_{bo}$.

19. The method according to claim 13, wherein said voltage reducing means comprises a miniature pulse step-down transformer having a high voltage primary side and a low voltage secondary side, said pulse step-down transformer producing said modified periodic oscillating waveform at its secondary side when said periodic oscillating waveform is applied to its primary side.

20. The method according to claim 13, wherein the step of storing charge comprises providing a resistor means having an electrical resistance and a first capacitor means having a first electrical capacitance for generating an RC oscillating waveform when said unregulated DC source is applied to the trickle power supply.

21. The method according to claim 13, wherein said step of accumulating and converting said reduced voltage periodic oscillating waveform using said voltage regulation means comprises:

coupling a first diode to said voltage reducing means for substantially removing the charging and discharging profiles from said reduced voltage periodic oscillating waveform, coupling a capacitor to said first diode for accumulating said reduced voltage periodic oscillating waveform, and coupling a Zener diode to said capacitor for adjusting said reduced voltage periodic oscillating waveform such that the regulated voltage and current of the trickle supply correspond to a chosen design point.

22. The method according to claim 13 further comprising the step of generating continuous DC trickle voltages and currents from an alternating current (AC) source by providing rectifying and filtering means coupled between an AC line input and said charge storage means, said AC rectifying and filtering means comprising:

a first diode coupled to receive and rectify an AC line input signal, and a first capacitor coupled to the first diode for providing a filtered, unregulated direct current (DC) voltage and current, said first capacitor further coupled to said charge storage means of said trickle power supply.

* * * * *